United States Patent
Kinoshita et al.

(10) Patent No.: US 9,523,702 B2
(45) Date of Patent: Dec. 20, 2016

(54) SENSOR UNIT, ELECTRONIC DEVICE, AND MOVING BODY

(71) Applicant: Seiko Epson Corporation, Tokyo (JP)

(72) Inventors: Yusuke Kinoshita, Minowa (JP); Yoshihiro Kobayashi, Komagane (JP); Yoshikuni Saito, Suwa (JP)

(73) Assignee: Seiko Epson Corporation (JP)

( * ) Notice: Subject to any disclaimer, the term of this patent is extended or adjusted under 35 U.S.C. 154(b) by 366 days.

(21) Appl. No.: 13/911,169

(22) Filed: Jun. 6, 2013

(65) Prior Publication Data

US 2013/0327143 A1  Dec. 12, 2013

(30) Foreign Application Priority Data

Jun. 8, 2012 (JP) .................. 2012-131190

(51) Int. Cl.
G01C 25/00 (2006.01)
G01C 21/16 (2006.01)
G01P 1/00 (2006.01)
G01P 21/00 (2006.01)

(52) U.S. Cl.
CPC .............. G01P 1/00 (2013.01); G01C 21/16 (2013.01); G01C 25/005 (2013.01); G01P 21/00 (2013.01)

(58) Field of Classification Search
CPC ............ G01P 1/02; G01P 1/023; G01P 21/00; G01P 21/02; G01C 25/00; G01C 25/005
USPC ......................... 73/1.37–1.38, 493
See application file for complete search history.

(56) References Cited

U.S. PATENT DOCUMENTS

| | | | |
|---|---|---|---|
| 5,980,267 A * | 11/1999 | Ayers | H05K 7/1092 439/60 |
| 6,738,721 B1 | 5/2004 | Drucke et al. | |
| 7,040,922 B2 | 5/2006 | Harney et al. | |
| 2007/0096308 A1* | 5/2007 | Shimoda | H01L 23/36 257/734 |
| 2009/0255335 A1 | 10/2009 | Fly et al. | |

FOREIGN PATENT DOCUMENTS

| | | |
|---|---|---|
| JP | 05-021684 | 1/1993 |
| JP | 05-340960 | 12/1993 |
| JP | 07-306047 | 11/1995 |
| JP | 11-211481 | 8/1999 |
| JP | 11-289141 | 10/1999 |
| JP | 2001-102746 A | 4/2001 |
| JP | 2002-009228 A | 1/2002 |
| JP | 2005-197493 A | 7/2005 |
| JP | 2006-058049 A | 3/2006 |
| JP | 2006-229121 A | 8/2006 |
| JP | 2008-128674 A | 6/2008 |
| JP | 2009-008632 A | 1/2009 |

* cited by examiner

*Primary Examiner* — Eric S McCall
*Assistant Examiner* — Anthony W Megna Fuentes
(74) *Attorney, Agent, or Firm* — Harness, Dickey & Pierce, P.L.C.

(57) ABSTRACT

A sensor unit includes sensors. Each of the sensors provides a measurement axis. A connector is electrically connected with the sensors. The position of the connector is fixed relative to the sensors. A memory unit stores calibration information which specifies the respective directions of the measurement axes with respect to a reference plane established for the connector.

8 Claims, 16 Drawing Sheets

SENSOR UNIT, ELECTRONIC DEVICE, AND MOVING BODY

BACKGROUND

1. Technical Field

The present invention relates to a sensor unit, and to an electronic device, a moving body and others including this sensor unit.

2. Related Art

An inertial sensor unit providing six degrees of freedom is generally known. The inertial sensor unit provides a three-axis acceleration sensor and a three-axis gyro sensor. The three-axis acceleration sensor and the three-axis gyro sensor are housed in a unit housing. The inertial sensor unit can output detection signals representing accelerations detected along orthogonal three measurement axes and angular velocities detected around orthogonal three measurement axes.

An example of the related art includes JP-A-5-21684.

During use, the inertial sensor unit is fixed to a target. The inertial sensor unit can be mounted on circuit boards of electronic devices, and further can be attached to moving bodies such as automobiles, airplanes, and vessels, and mechanisms such as industrial machines and robots. When mounted on a circuit board, for example, the inertial sensor unit is positioned on this circuit board. The measurement axes of the inertial sensor unit are determined in accordance with this positioning. Therefore, the positioning of the inertial sensor unit requires scrupulous and sufficient attention, and this necessity lowers the efficiency of assembling processes.

SUMMARY

An advantage of at least one aspect of the invention is to improve the efficiency of assembling processes.

(1) An aspect of the invention is directed to a sensor unit which includes a sensor providing a measurement axis, a connector electrically connected with the sensor with the position of the connector fixed with respect to the sensor, and a memory unit which stores calibration information for specifying the direction of the measurement axis with respect to a reference plane established for the connector.

For positioning the sensor unit, the connector is joined to a receiver connector (hereinafter referred to as a "first connector") paired with the former connector (hereinafter referred to as a "second connector"). The sensor unit is supported by the first connector. The posture of the reference plane of the second connector can be uniquely determined with respect to the first connector. Thus, the direction of the measurement axis can be specified with respect to the first connector based on the calibration information.

The sensor unit can be incorporated and used in an electronic device, a moving body, or a machine, for example. The sensor unit can be attached to a substrate, an object, or a structure. For this attachment, the first connector can be fixed to the substrate, the object, or the structure beforehand. When the second connector is joined with the first connector, the reference plane with respect to the substrate, the object, or the mechanism can be maintained in a specified posture. This structure can easily position the sensor unit on the substrate, the object, or the mechanism, and eliminate the necessity of complicated positioning processes required for the setting of the sensor unit. Accordingly, the efficiency of assembling processes can improve.

(2) The sensor unit may further include a processing unit which corrects a detection value detected based on the measurement axis in accordance with the calibration information to obtain a detection value based on a reference coordinate system established for the reference plane. According to the sensor unit providing this structure, calibration of the measurement axis is performed beforehand. The calibration specifies the individual measurement axis of the sensor within the reference coordinate system. In specifying the measurement axis, the deviation between the measurement axis fixed to the reference coordinate system (hereinafter referred to as a "reference measurement axis") and the individual measurement axis of the sensor is calculated. The detection value detected in accordance with the measurement axis of the sensor is calibrated based on the deviation thus calculated. Accordingly, the detection value based on the reference measurement axis can be outputted.

(3) The second connector may have an outer surface which defines the reference plane. For positioning the sensor unit, the outer surface of the second connector is guided by a guide surface of the first connector. Thus, the measurement axis of the sensor can be defined on the first connector in a predetermined manner only by joining the second connector to the first connector.

(4) The second connector may have a plate shape and project from a structure which houses the sensor. The configuration of the second connector which projects from the structure allows the sensor to be securely accommodated within the structure. Even in this condition, junction between the second connector and the first connector can be achieved. Accordingly, the sensor unit can be securely attached to the substrate, the object, or the structure.

(5) The sensor may be at least either a gyro sensor or an acceleration sensor. The gyro sensor can detect an angular velocity around the measurement axis. The sensor unit can output a detection signal specifying the detected angular velocity through the second connector. The acceleration sensor can detect acceleration in the axial direction of the measurement axis. The sensor unit can output a detection signal for specifying the detected acceleration through the second connector. An inertial sensor can be produced when the acceleration sensor is combined with the gyro sensor.

(6) The sensor unit may be incorporated and used in an electronic device. Accordingly, the electronic device can include the sensor unit.

(7) The sensor unit may be incorporated and used in a moving body. Accordingly, the moving body can include the sensor unit.

(8) Another aspect of the invention is directed to a calibration method for a sensor unit which includes: positioning a sensor unit on a rotary table, which sensor unit includes a connector electrically connected with a sensor providing a measurement axis with the position of the connector fixed with respect to the sensor and fixing the connector to the rotary table; rotating the rotary table to apply an external force to the sensor; and specifying the deviation between a measurement axis based on a reference plane of the connector and the actual measurement axis of the sensor in accordance with a detection value outputted from the sensor at the time of application of the external force.

According to this method, the individual measurement axis of the sensor can be defined within the reference coordinate system fixed to the reference plane. The deviation between the measurement axis based on the reference plane of the connector and the actual measurement axis of the sensor can be determined. The detection value detected according to the measurement axis of the sensor is calibrated based on the determined deviation. Accordingly, the detection value in correspondence with the measurement axis based on the reference plane of the connector can be outputted.

(9) A connector which receives the connector of the sensor unit may be fixed to the rotary table. In this case, the connector of the sensor unit can be fixed to a predetermined position of the sensor unit only by joining the connector of the sensor unit to the connector provided on the rotary table.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention is hereinafter described with reference to the accompanying drawings. The embodiment described herein is not intended to limit the scope of the invention claimed in the appended claims for any unjustified reasons. Therefore, all the structures shown in the embodiment are not necessarily essential for providing the advantages of the invention.

(1) Electronic Device

Figure 1:
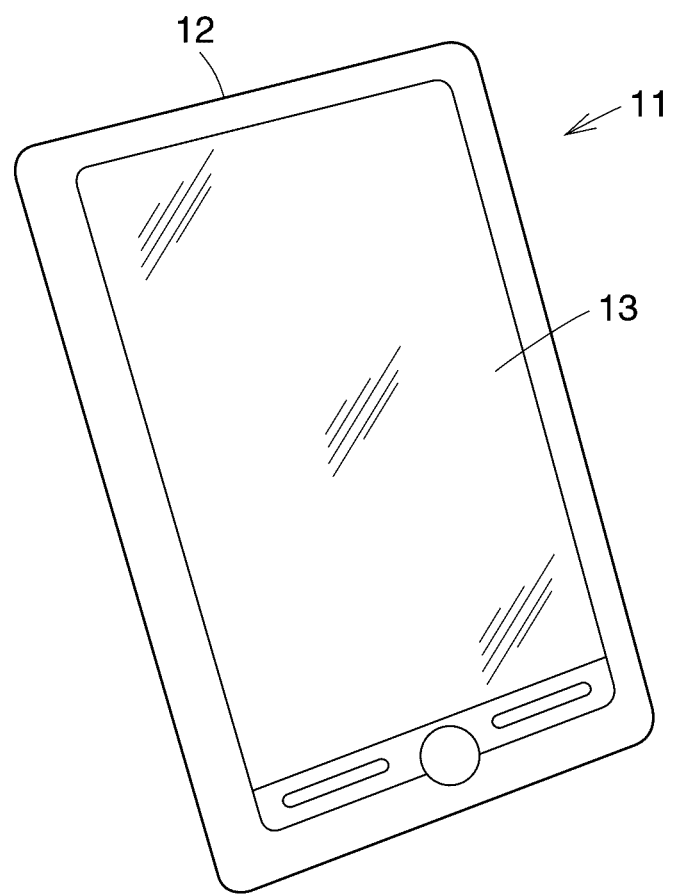
FIG. 1 is a perspective view schematically illustrating the external appearance of a smart phone according to a specific example of an electronic device.

FIG. 1 schematically illustrates a smart phone 11 according to a specific example of an electronic device. The smart phone 11 provides a housing 12. The housing 12 includes a touch screen panel 13 embedded therein. A user of the smart phone 11 can touch the touch screen panel 13 by the finger, for example, to input instructions and information to the smart phone 11. The smart phone 11 can display various types of information on the screen of the touch screen panel 13.

Figure 2:
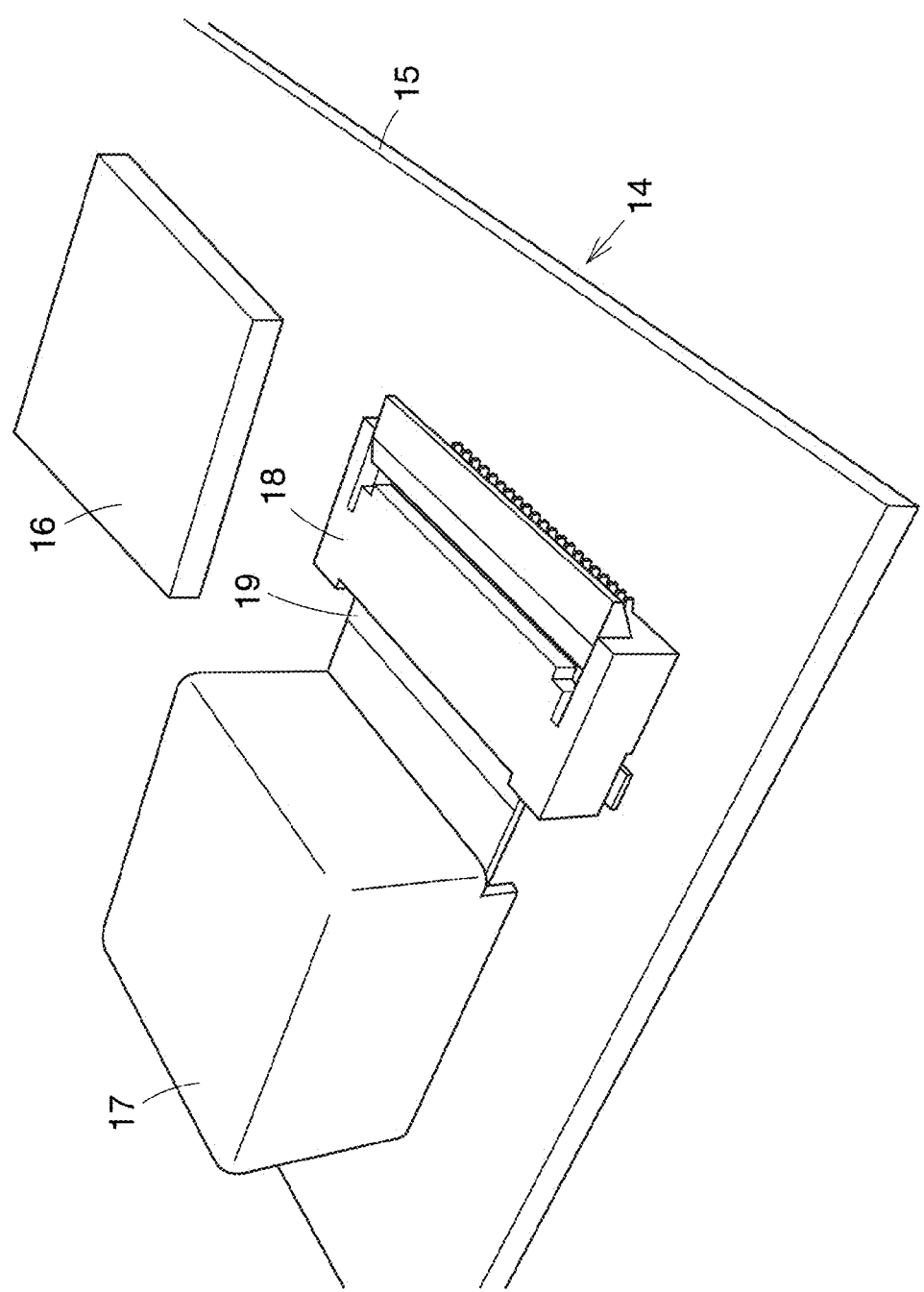
FIG. 2 is an enlarged partial perspective view schematically illustrating the structure of a circuit board unit.

The smart phone 11 provides a circuit board unit. The circuit board unit is housed within the housing 12. As illustrated in FIG. 2, a circuit board unit 14 provides a printed-circuit board 15. A processing circuit, or a micro processor unit (MPU, or processing circuit) 16 is mounted on the printed-circuit board 15. The MPU 16 performs various types of software programs. For execution of the software programs, the MPU 16 receives signals from the touch screen panel 13. With execution of the software programs, the MPU can display images associated with the corresponding software programs on the screen of the touch screen panel 13. In addition, an image processing circuit and a communication circuit can be mounted on the printed-circuit board 15.

A sensor unit 17 is attached to the printed-circuit board 15. For attachment of the sensor unit 17, a socket (first connector) 18 is mounted on the printed-circuit board 15. The sensor unit 17 is joined to the socket 18. The sensor unit 17 provides a card edge connector (second connector) 19. The card edge connector 19 is inserted into the socket 18. The functions of these connectors allow the sensor unit 17 to be fixed in a predetermined posture with respect to the printed-circuit board 15. In other words, a proper posture of the sensor unit 17 can be established with respect to a target when the posture of the printed-circuit board 15 is appropriately determined with respect to the target. The MPU 16 can receive detection signals from the sensor unit 17. The MPU 16 can process the detection signals received from the sensor unit 17 for execution of the software programs. The MPU 16 can output the processing results. Examples of the electronic device include motion sensing units, home game machines, motion analysis apparatuses, surgical operation navigation systems, automotive navigation systems, and others as well as the smart phone 11.

(2) Sensor Unit in First Embodiment

Figure 3:
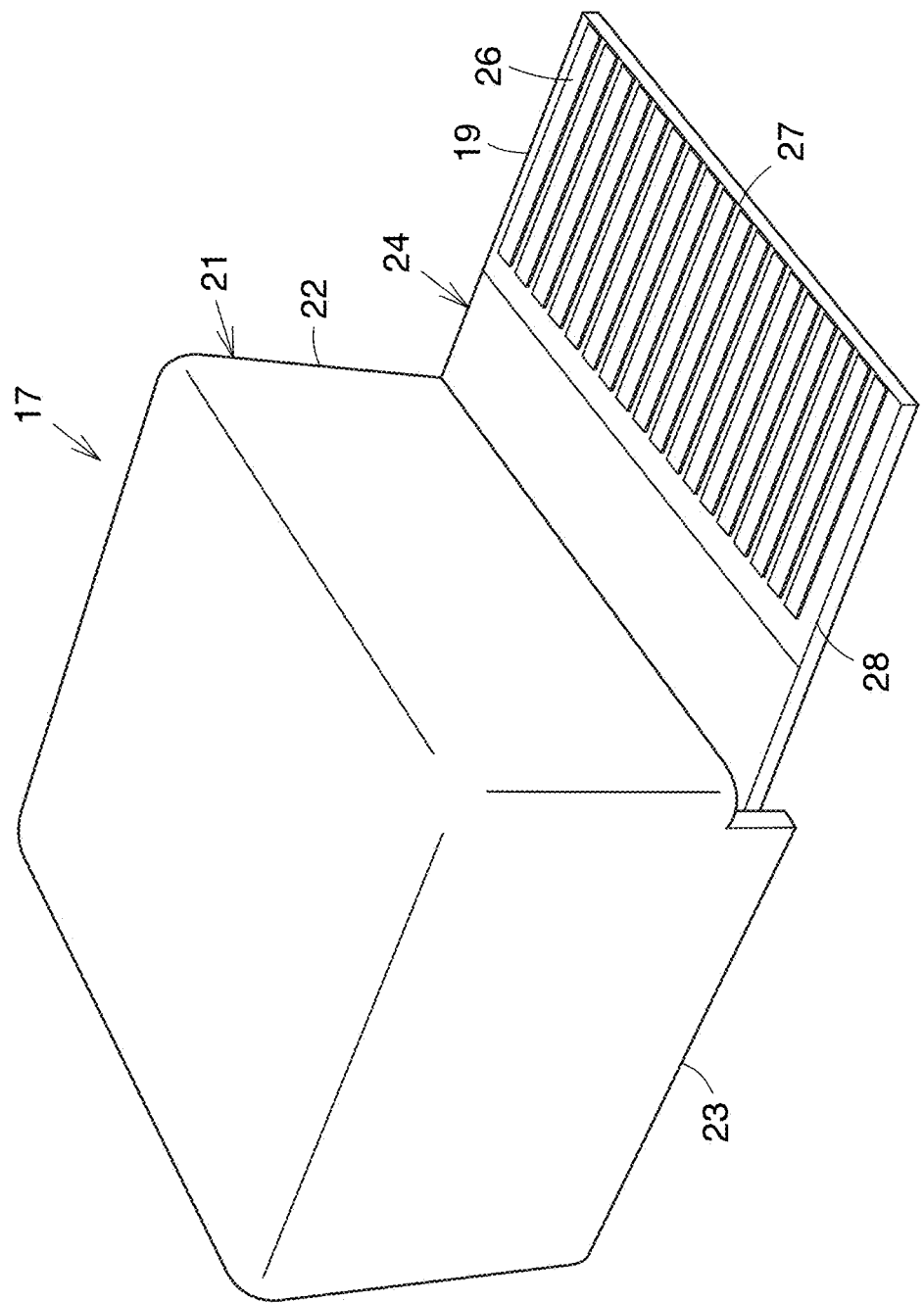
FIG. 3 is an enlarged perspective view schematically illustrating the external appearance of a sensor unit according to a first embodiment.
Figure 4:
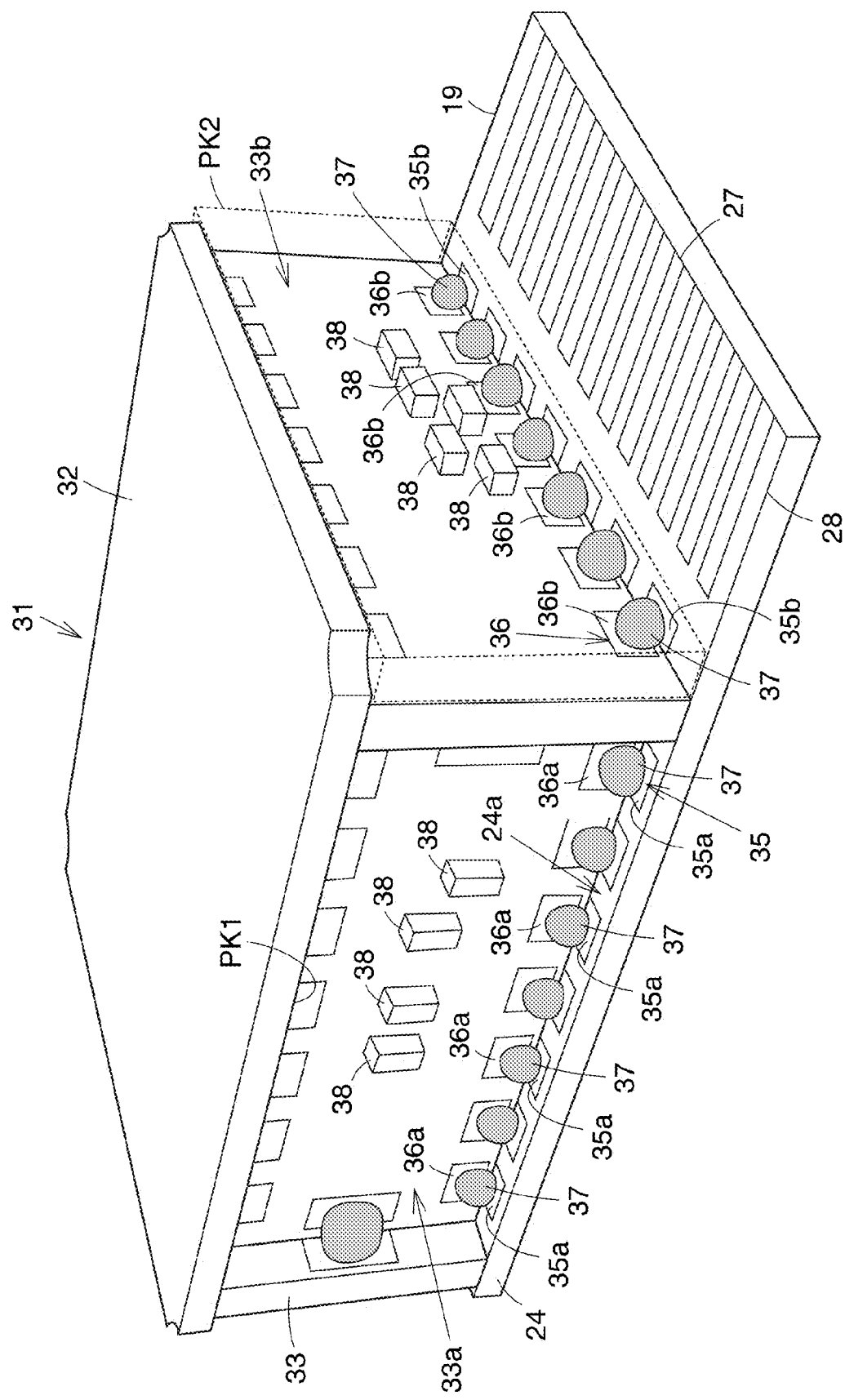
FIG. 4 is an enlarged perspective view schematically illustrating the structure of a board assembly.

As illustrated in FIG. 3, the sensor unit 17 according to a first embodiment provides an external case 21. The external case 21 provides a rectangular-parallelepiped box shape, for example. The external case 21 isolates the internal space of the rectangular parallelepiped. The external case 21 can be divided into a box 22 and a base 23, for example. The box 22 covers the top surface and the four side surfaces of the internal space. The base 23 covers the bottom surface of the internal space. The box 22 and the base 23 can be made of aluminum, for example. The surfaces of the box 22 and the base 23 can be coated with plating film of nickel, for example.

The sensor unit 17 provides an interface board 24. The interface board 24 is constituted by a rigid board. The base body of the rigid board can be formed by a resin plate or a ceramic plate, for example. The resin plate can be made of resin impregnated in glass fibers, for example.

The interface board 24 constitutes the card edge connector 19. The card edge connector 19 projects to the outside of the external case 21. The card edge connector 19 provides a plurality of strip-shaped connection terminals 26. The connection terminals 26 are arranged in parallel with each other on the front and rear surfaces of the interface board 24. The connection terminals 26 extend in the direction perpendicular to a linear edge 27. The connection terminals 26 can be made of conductive material such as copper. The card edge connector 19 provides a side edge 28 extending perpendicular to the edge 27.

A board assembly (structure) 31 is housed in the internal space of the box 22. The board assembly 31 provides the interface board 24, a top plate 32, and a frame 33. The frame 33 can be constituted by four boards standing upward from the plate surface of the interface board 24, for example. These four boards and the top plate 32 can be constituted by rigid boards. The frame 33 is interposed between the interface board 24 and the top plate 32. The interface board 24, the top plate 32, and the frame 33 form a box-shaped hexahedron. Each base body of the rigid boards can be constituted by a resin plate or a ceramic plate, for example. The resin plate can be made of resin impregnated in glass fibers, for example. The frame 33 closes the four side surfaces of the housing space of the hexahedron. The top plate 32 closes the top surface of the housing space of the hexahedron.

The interface board 24 provides a first connective wiring 35. The first conductive wiring 35 is made of conductive material. The conductive material may be metal material such as copper. The first conductive wiring 35 provides first conductive pads 35a and second conductive pads 35b. The first conductive pads 35a and the second conductive pads 35b are provided outside the frame 35 and disposed on a plate surface 24a of the interface board 24. The first conductive pads 35a are arranged in a line between one side of the contour of the interface board 24 and a plate surface 33a of the frame 33. The one side of the contour of the interface board 24 extends in parallel with the plate surface 33a. The second conductive pads 35b are arranged in a line between the card edge connector 19 and a plate surface 33b of the frame 33. The plate surface 33b and the edge 27 are disposed in parallel with each other. The first conductive pads 35a and the second conductive pads 35b can be provided as thin films extending on the front surface of the base body.

The frame 33 provides a second conductive wiring 36. The second conductive wiring 36 is made of conductive material. The conductive material may be metal material such as copper. The second conductive wiring 36 provides first connection terminals 36a and second connection terminals 36b. The first connection terminals 36a are provided on the plate surface 33a of the frame 33. The second connection terminals 36b are provided on the plate surface 33b of the frame 33. The first connection terminals 36a and the second connection terminals 36b can be provided as thin films extending on the plate surface of the base body without entering the end surfaces of the base body.

The board assembly 31 provides junction members 37. The junction members 37 are joined to the first conductive wiring 35 and the second conductive wiring 36. Each of the junction members 37 is simultaneously fixed to the first conductive pad 35a and the corresponding first connection terminal 36a of the frame 33. The first conductive pads 35a are connected with the first connection terminals 36a with one-to-one correspondence. Similarly, each of the junction members 37 is simultaneously fixed to the second conductive pad 35b and the corresponding second connection terminal 36b of the frame 33. The second conductive pads 35b are connected with the second connection terminals 36b with one-to-one correspondence. The junction members 37 have conductivity. The junction members 37 are made of solders, for example. The junction members 37 may be made of conductive adhesives in place of solders, for example. The interface board 24 and the frame 33 are physically connected with each other via the junction members 37.

Electronic components 38 are mounted on the plate surfaces 33a and 33b of the frame 33. The electronic components 38 can be electrically connected with the second conductive wiring 36, for example. The electronic components 38 are housed in pocket spaces PK1 and PK2. The pocket spaces PK1 and PK2 are sandwiched between the extended area of the interface board 24 and the extended area of the top plate 32. The extended areas are produced by the interface board 24 and the top plate 32 extending toward the outside from the plate surfaces 33a and 33b of the frame 33 on the housing space side. Each extension volume of the extended areas is made larger than the maximum height of the electronic components 38.

Figure 5:
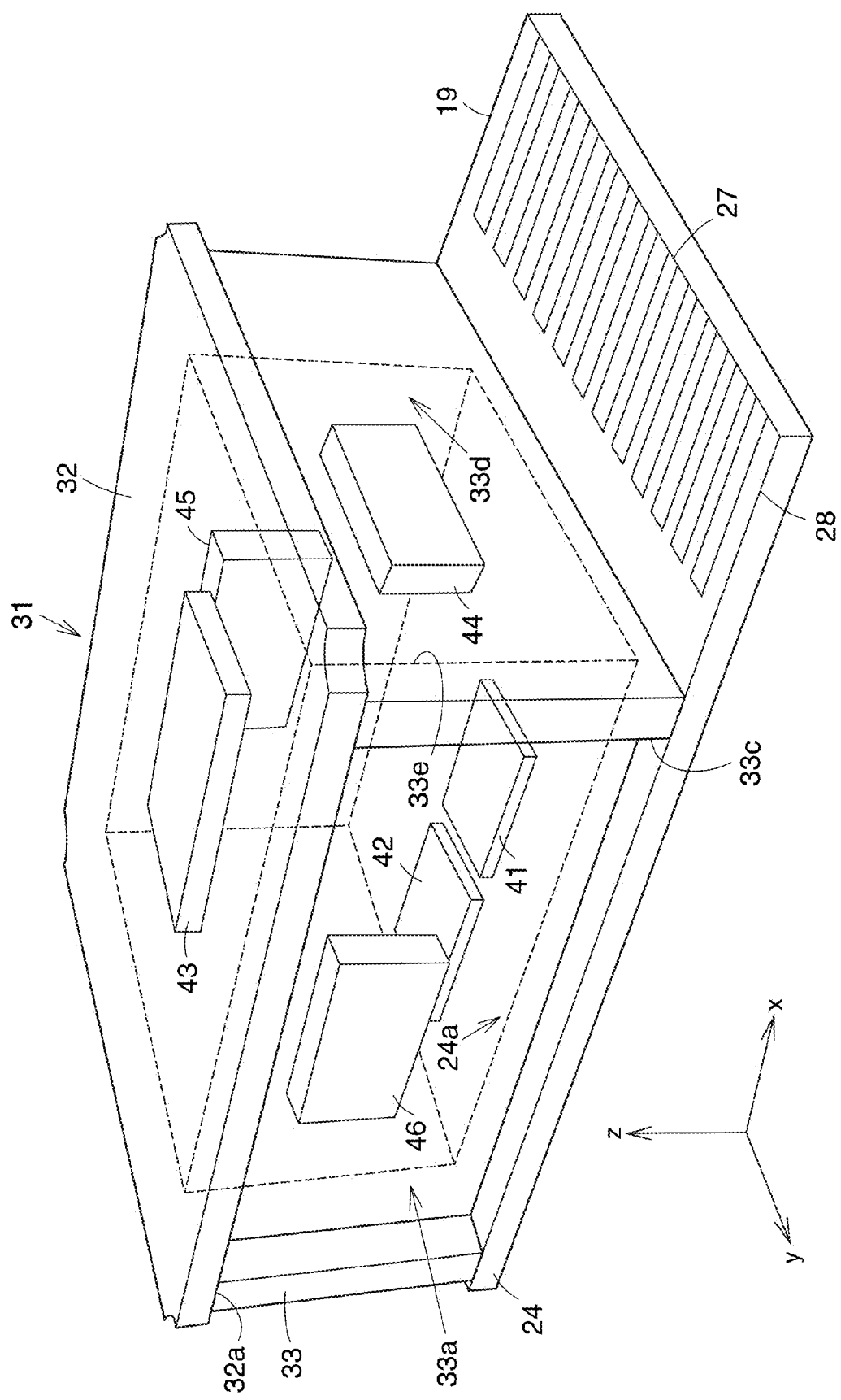
FIG. 5 is an enlarged see-through perspective view schematically illustrating the layout of a group of electronic components.

As illustrated in FIG. 5, a group of electronic components are housed in the housing space of the board assembly 31. The group of electronic components include a microprocessor unit (MPU, or processing unit) 41, a memory (memory unit) 42, a first sensor 43, a second sensor 44, a third sensor 45, and a fourth sensor 46. The MPU 41 and the memory 42 are mounted on the plate surface 24a of the interface board 24. The MPU 41 is electrically connected with the first conductive wiring 35. The MPU 41 can be joined with the card edge connector 19 via the first conductive wiring 35. The MPU 41 can transmit and receive signals to and from the outside through the card edge connector 19. The memory 42 stores calibration information. The details of calibration information will be described below.

The first sensor 43 is mounted on a plate surface 32a (i.e., ceiling surface of housing space) of the top plate 32. The first sensor 43 is constituted by a one-axis gyro-sensor, for example. The one-axis gyro-sensor is of an oscillation type. More specifically, the one-axis gyro-sensor detects angular velocity based on the oscillation of a detection piece caused by the oscillation of an oscillation piece. The one-axis gyro-sensor provides a measurement axis corresponding to a vertical axis perpendicular to the plate surface 32a of the top plate 32. The first sensor 43 is connected with the second conductive wiring 36, while the first connection terminals 36a and (or) the second connection terminals 36b of the second conductive wiring 36 are connected with the first conductive pads 35a and (or) the second conductive pads 35b of the first conductive wiring 35. These connections allow supply of detection signals from the first sensor 43 to the MPU 41 via the second conductive wiring 36 and the first conductive wiring 35, and supply of control signals from the MPU 41 to the first sensor 43. For providing these connections, continuity vias and wiring patterns can be equipped within the base body of the top plate 32. The first sensor 43 is electrically connected with the card edge connector 19 via the MPU 41.

The second sensor 44 is mounted on one plate surface 33c (i.e., one side surface of housing space) of the frame 33. The plate surface 33c crosses the plate surface 32a of the top plate 32 at right angles. The second sensor 44 is constituted by a one-axis gyro-sensor, for example. The one-axis gyro-sensor is of an oscillation type. The one-axis gyro-sensor provides a measurement axis corresponding to a vertical axis perpendicular to the plate surface 33c of the frame 33. The second sensor 44 is electrically connected at least with the second conductive wiring 36. The second connection terminals 36b of the second conductive wiring 36 are connected with the second conductive pads 35b of the first conductive wiring 35. These connections allow supply of detection signals from the second sensor 44 to the MPU 41 via the second conductive wiring 36 and the first conductive wiring 35, and supply of control signals from the MPU 41 to the second sensor 44. For providing these connections, continuity vias and wiring patterns can be equipped within the base body of the frame 33. The second sensor 44 is electrically connected with the card edge connector 19 via the MPU 41.

The third sensor 45 is mounted on the plate surface 33d (i.e., one side surface of housing space) of the frame 33. The plate surface 33d crosses the plate surface 32a of the top plate 32 at right angles, and simultaneously crosses the one plate surface 33c of the frame 33 at right angles. The third sensor 45 is constituted by a one-axis gyro-sensor, for example. The one-axis gyro-sensor is of an oscillation type. The one-axis gyro-sensor provides a measurement axis corresponding to a vertical axis perpendicular to the plate surface 33d of the frame 33. The third sensor 45 is electrically connected at least with the second conductive wiring 36. The first connection terminals 36a of the second conductive wiring 36 are connected with the first conductive pads 35a of the first conductive wiring 35. These connections allow supply of detection signals from the third sensor 45 to the MPU 41 via the second conductive wiring 36 and the first conductive wiring 35, and supply of control signals from the MPU 41 to the third sensor 45. For providing these connections, continuity vias and wiring patterns can be equipped within the base body of the frame 33. The measurement axes of the first sensor 43, the second sensor 44, and the third sensor 45 can constitute three orthogonal axes. The third sensor 45 is electrically connected with the card edge connector 19 via the MPU 41.

The fourth sensor 46 is mounted on one plate surface 33e (i.e., one side surface of housing space) of the frame 33. The fourth sensor 46 is constituted by a three-axis acceleration sensor, for example. The three-axis acceleration sensor can detect accelerations in the directions of a vertical axis perpendicular to the plate surface 32a of the top plate 32, a vertical axis perpendicular to the plate surface 33c of the frame 33, and a vertical axis perpendicular to the plate surface 33d of the frame 33. The fourth sensor is electrically connected at least with the second conductive wiring 36. The first connection terminals 36a of the second conductive wiring 36 are connected with the first conductive pads 35a of the first conductive wiring 35. These connections allow supply of detection signals from the fourth sensor 46 to the MPU 41 via the second conductive wiring 36 and the first conductive wiring 35, and supply of control signals from the MPU 41 to the fourth sensor 46. For providing these connections, continuity vias and wiring patterns can be equipped within the base body of the frame 33. The fourth sensor 46 is electrically connected with the card edge connector 19 via the MPU 41.

The first through fourth sensors 43 through 46 are mounted on the board assembly 31. Thus, the positions and postures of the first through fourth sensors 43 through 46 are fixed relative to the card edge connector 19. A plate surface 19a and the side edge 28 of the card edge connector 19 define a reference plane of the board assembly 31. A reference coordinate system xyz is established for the plate surface 19a and the side edge 28 of the card edge connector 19. Thus, each measurement axis of the first through fourth sensors 43 through 46 can be determined within the reference coordinate system xyz. The coordinates of the reference coordinate system xyz can be used for this determination.

According to the sensor unit 17, the fourth sensor 46 detects accelerations in the axial directions of the three orthogonal axes, while the first sensor 43, the second sensor 44, and the third sensor 45 detect angular velocities around the respective axes. The detection signals of the first through fourth sensors 43 through 46 are supplied to the MPU 41. The MPU 41 calculates the accelerations and angular velocities based on the detection signals. For this calculation, the MPU 41 refers to calibration information stored in the memory 42. The calibration information specifies the directions of the measurement axes of the first through fourth sensors 43 through 46 with respect to the reference plane. The MPU 41 corrects the outputs of the first through fourth sensors 43 through 46 based on the calibration information. The obtained detection values are corrected in accordance with the measurement axes. As a result, detection values in correspondence with the reference coordinate system xyz are produced. The corrected detection values can be outputted from the card edge connector 19 to the outside. The sensor unit 17 providing this structure can function as an inertial measurement unit (IMU).

(3) Attachment of Sensor Unit

The method for attachment of the sensor unit 17 is now briefly explained. For this attachment, the socket 18 is mounted on the printed-circuit board 15 beforehand. The socket 18 is accurately aligned on the printed-circuit board 15.

Figure 6:
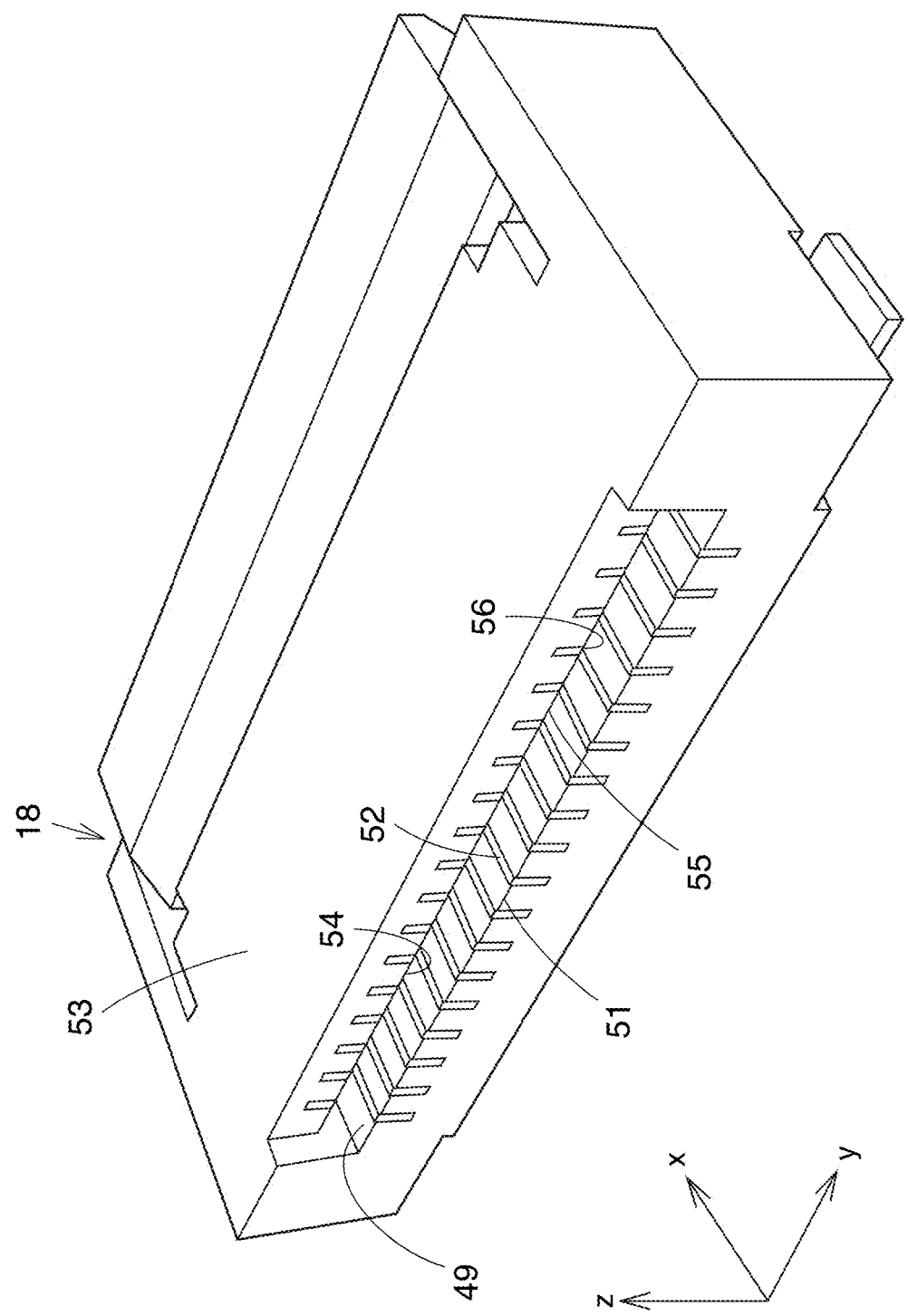
FIG. 6 is an enlarged perspective view schematically illustrating the external appearance of a socket.

As illustrated in FIG. 6, the socket 18 provides a first guide surface 49. The first guide surface 49 is constituted by a flat surface. An edge 51 of the first guide surface 49 is linearly defined. A local coordinate system xyz is determined for the socket 18. The first guide surface 49 is disposed in parallel with the x-y plane of the local coordinate system xyz. The edge 51 of first guide surface 49 is disposed in parallel with the y-axis of the local coordinate system xyz. The first guide surface 49 is only required to be positioned in parallel with the front surface of the printed-circuit board 15, for example. The posture of the socket 18 can be arbitrarily determined on the printed-circuit board 15.

A plurality of strip-shaped first connector terminals 52 are provided on the first guide surface 49. The first connector terminals 52 are arranged in parallel with each other. Each of the first connector terminals 52 extends in the direction perpendicular to the edge 51 of the first guide surface 49 (in parallel with x-axis). The distance between the adjoining first connector terminals 52 is equalized with the distance between the adjoining connection terminals 26 of the card edge connector 19. The first connecter terminals 52 can be made of conductive material such as copper.

The socket 18 provides a guide member 53. The guide member 53 provides a second guide surface 54 extending in parallel with the first guide surface 49. An edge 55 of the second guide surface 54 is linearly defined. The edge 55 of the second guide surface 54 is disposed in parallel with the y-axis. A plurality of strip-shaped second connector terminals 56 are provided on the second guide surface 54. The second connector terminals 56 are arranged in parallel with each other. Each of the second connector terminals 56 extends in the direction perpendicular to the edge 55 of the second guide surface 54 (in parallel with x-axis). The distance between the adjoining second connector terminals 56 is equalized with the distance between the adjoining connection terminals 26 of the card edge connector 19. The second connecter terminals 56 can be made of conductive material such as copper.

The second guide surface 54 faces to the first guide surface 49 leaving a clearance between the first and second guide surfaces 49 and 54. This arrangement produces a flat space between the second guide surface 54 and the first guide surface 49. The space thus produced can receive the card edge connector 19. According to this structure, the second connector terminals 56 can generate an elastic force which presses the card edge connector 19 toward the first guide surface 49 within the space, for example. The edge 55 of the second guide surface 54 and the edge 51 of the first guide surface 49 are disposed in parallel with each other. Thus, an insertion port for receiving the card edge connector 19 can be produced between the edges 55 and 51.

Figure 7:
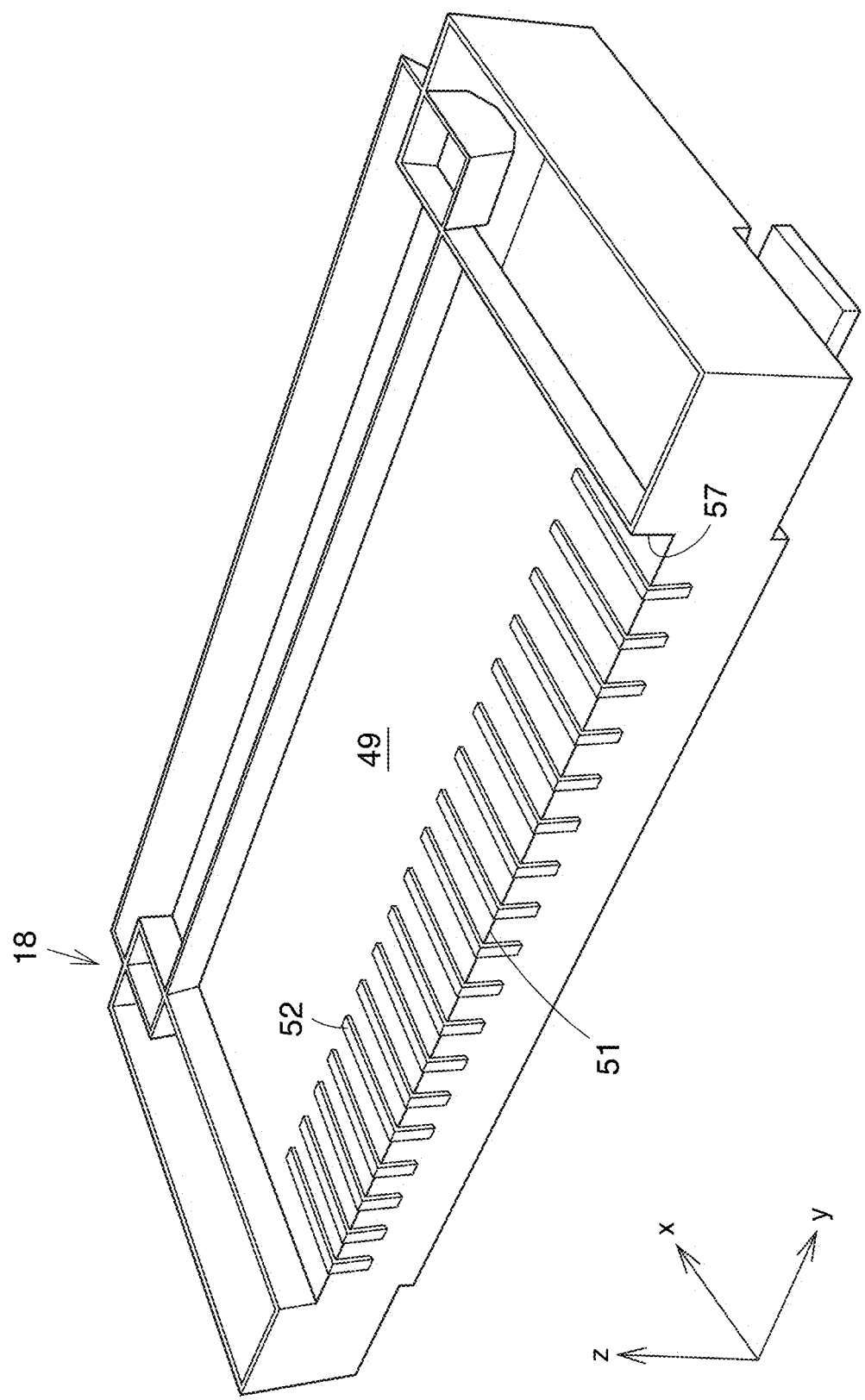
FIG. 7 is an enlarged perspective view schematically illustrating the internal structure of the socket.

As illustrated in FIG. 7, a guide wall 57 is disposed in a condition associated with the first guide surface 49. The guide wall 57 linearly extends in the direction perpendicular to the edge 51 of the first guide surface 49 (in parallel with x-axis).

Figure 8:
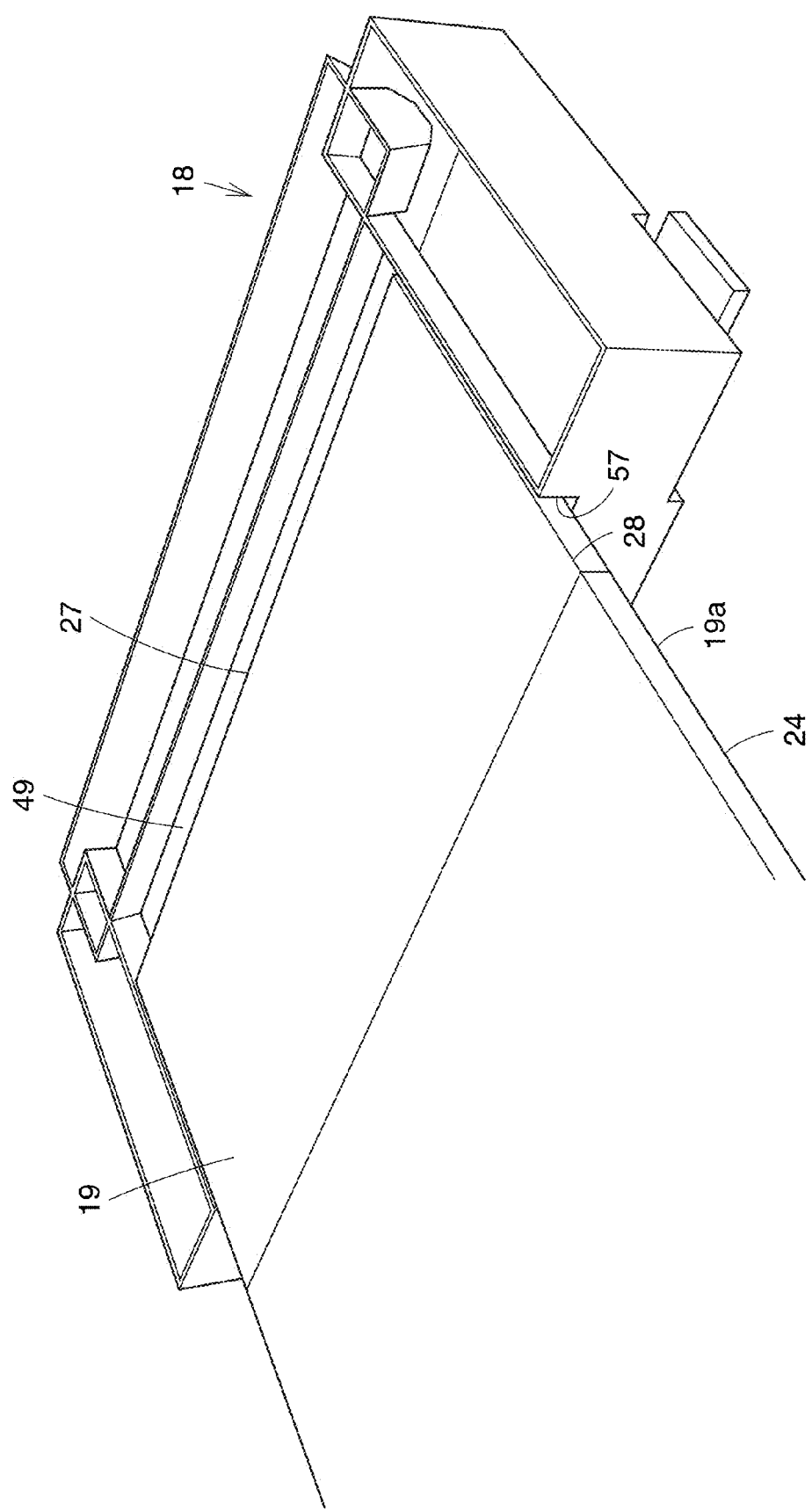
FIG. 8 is an enlarged perspective view schematically illustrating a plug guided by the socket.

As illustrated in FIG. 8, the lower plate surface 19a (surface facing to below) of the card edge connector 19 overlaps with the first guide surface 49 when the card edge connector 19 is inserted from the insertion port. The connection terminals 26 of the card edge connector 19 contact the first connector terminals 52 of the socket 18, in which continuity is secured therebetween. In this case, the card edge connector 19, or the sensor unit 17 can be aligned on the x-y plane of the local coordinate system xyz. Simultaneously, the connection terminals 26 of the card edge connector 19 contact the second connector terminals 56 of the socket 18. This positioning can be securely achieved when the second connector terminals 56 press the card edge connector 19 with a sufficient pressing force, for example.

Simultaneously, the side edge 28 of the card edge connector 19 abut the guide wall 57 at the time of insertion of the card edge connector 19 between the first guide surface 49 and the second guide surface 54. The movement of the side edge 28 is guided by the guide wall 57 with surface-contact or line-contact produced therebetween. In this condition, the direction of the side edge 28 is made in parallel with the x-axis of the local coordinate system xyz. The rotation of the card edge connector 19 around the z-axis can be prevented by the contact between the side edge 28 and the guide wall 57. This structure can determine the relative position and the relative posture of the sensor unit 17 with respect to the socket 18 on the board 15. Accordingly, the reference coordinate system xyz of the sensor unit 17 can be set in coincidence with the local coordinate system xyz of the socket 18 without changing the predetermined positional relationship. The abutment of the edge 27 may be used for the positioning on the x-y plane instead of the abutment of the side edge 28.

According to the structure of the smart phone 11, the card edge connector 19 is joined to the socket 18 paired therewith for the positioning of the sensor unit 17. The sensor unit 17 is supported by the socket 18. The posture of the reference plane of the card edge connector 19 can be uniquely determined with respect to the socket 18. Thus, the directions of the measurement axes of the first through fourth sensors 43 through 46 with respect to the socket 18 can be determined based on the calibration information.

The sensor unit 17 can be attached to the printed-circuit board 15. For this attachment, the socket 18 can be fixed to the printed-circuit board 15 beforehand. When the card edge connector 19 is joined with the socket 18, the plate surface 19a and the side edge 28 of the card edge connector 19 can be maintained in specified postures with respect to the printed-circuit board 15. This structure can easily achieve the setting of the sensor unit 17 on the printed-circuit board 15, and eliminate the necessity of complicated positioning processes required for the setting of the sensor unit 17. Accordingly, the efficiency of assembling processes can improve.

The calibration information specifies the directions of the measurement axes of the first through fourth sensors 43 through 46 with respect to the plate surface 19a and the side edge 28 of the card edge connector 19. In this case, an individual measurement axis is specified for each of the first through fourth sensors 43 through 46 within the reference coordinate system xyz. In specifying the measurement axes, the deviation between the measurement axes fixed to the reference coordinate system xyz (hereinafter referred to as "reference measurement axes") and the individual measurement axes specified for the first through fourth sensors 43 through 46 is determined. The detection values detected in accordance with the measurement axes of the sensors 43 through 46 can be calibrated by utilizing the deviation, and outputted in correspondence with the reference measurement axes.

(4) Calibration of Sensor Unit

Figure 9:
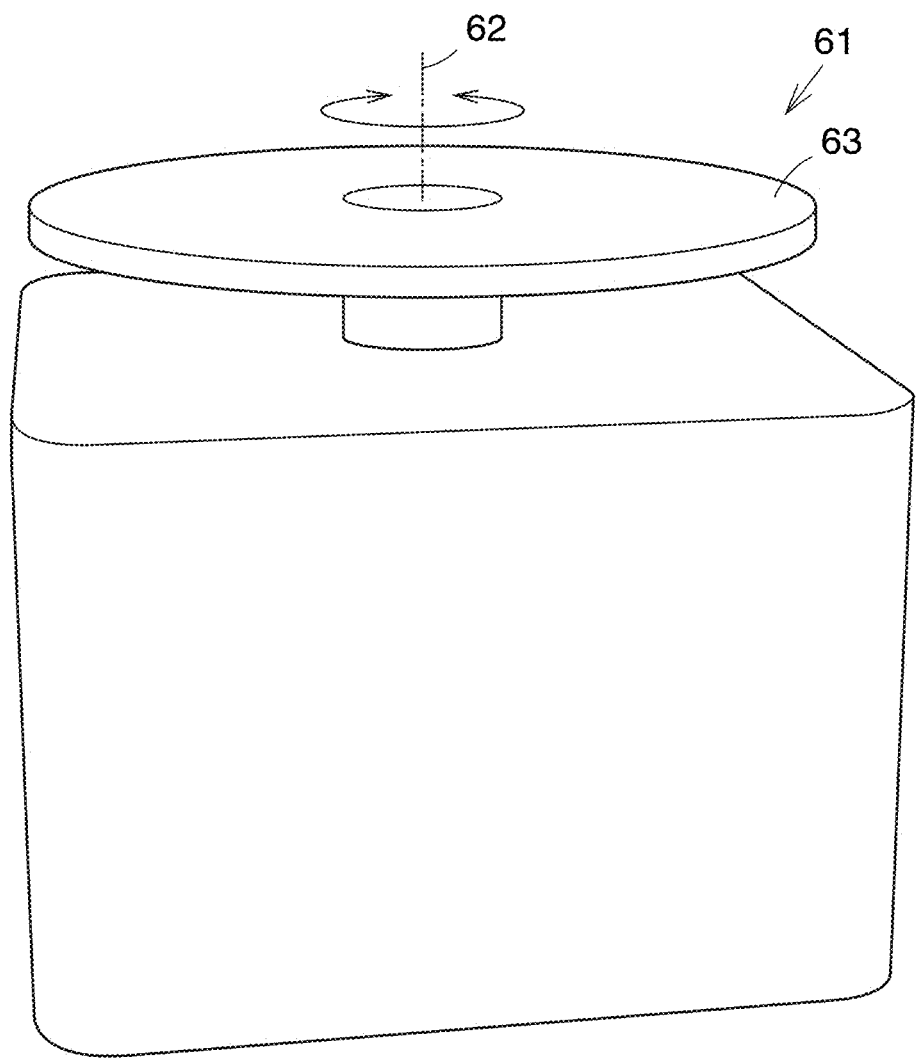
FIG. 9 is a perspective view schematically illustrating the structure of a calibration device.

As illustrated in FIG. 9, a calibration device 61 can be used for generating calibration information. The calibration device 61 provides a rotary table 63 rotatable around a vertical axis 62, for example. The rotary table 63 can rotate at a predetermined rotation speed. According to this embodiment, the vertical axis 62 can agree with the direction of gravity.

Figure 10:
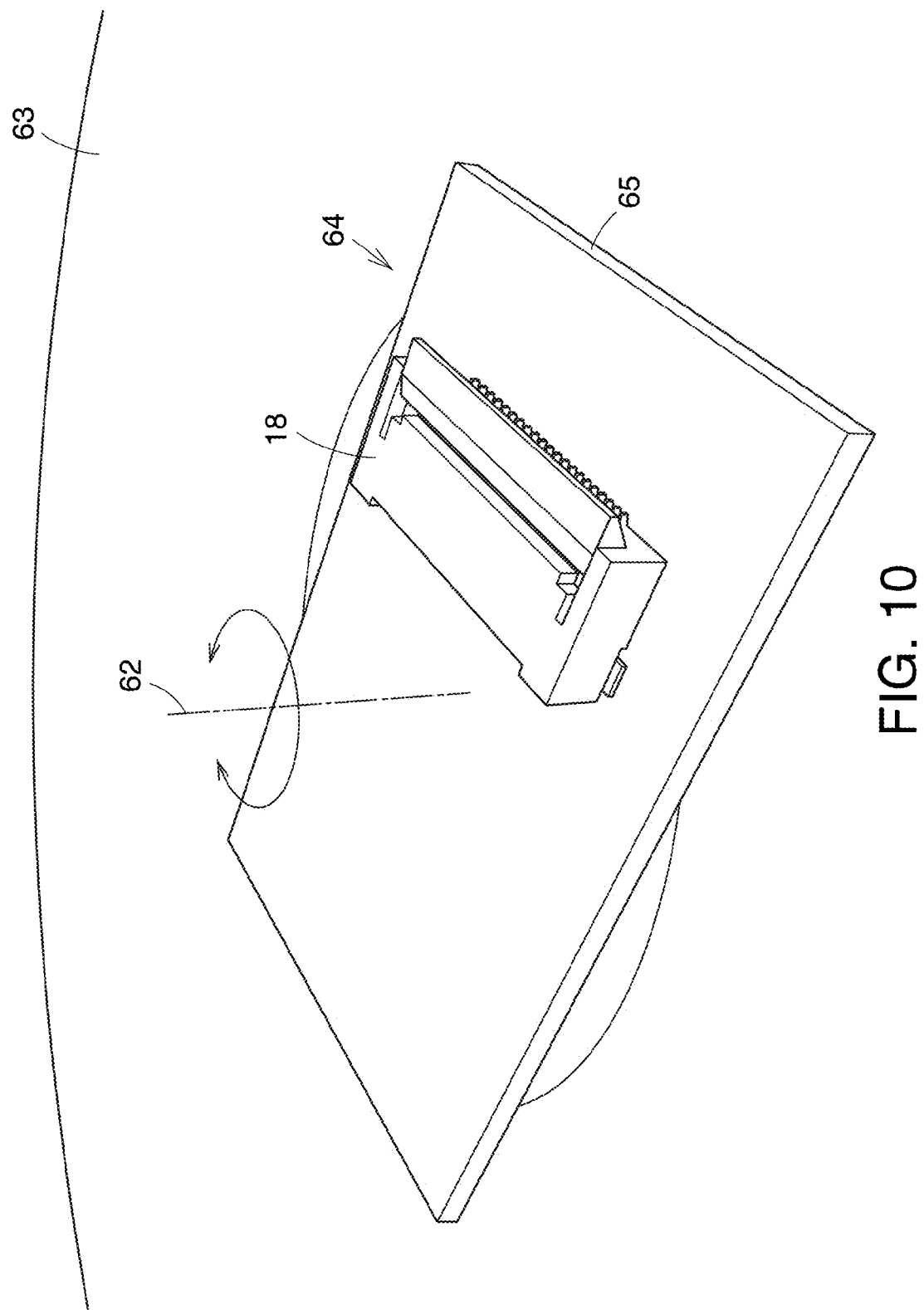
FIG. 10 is an enlarged partial perspective view schematically illustrating the calibration device, showing a measurement board unit positioned on a rotary table of the calibration device.

As illustrated in FIG. 10, a measurement board unit 64 is set on the rotary table 63. The measurement board unit 64 is rigidly fixed to the rotary table 63. The measurement board unit 64 includes a printed-circuit board 65. The socket 18 is mounted on the printed-circuit board 65. The socket 18 is aligned with respect to the rotation axis (vertical axis 62) of the rotary table 63. According to this embodiment, the posture of the card edge connector 19 is uniquely determined with respect to the socket 18. Thus, the measurement axes established on the basis of the plate surface 19a and the side edge 28 of the card edge connector 19 can be aligned with respect to the vertical axis 62 in accordance with the alignment of the socket 18. These measurement axes correspond to apparent measurement axes observed based on the plate surface 19a and the side edge 28.

Figure 11:
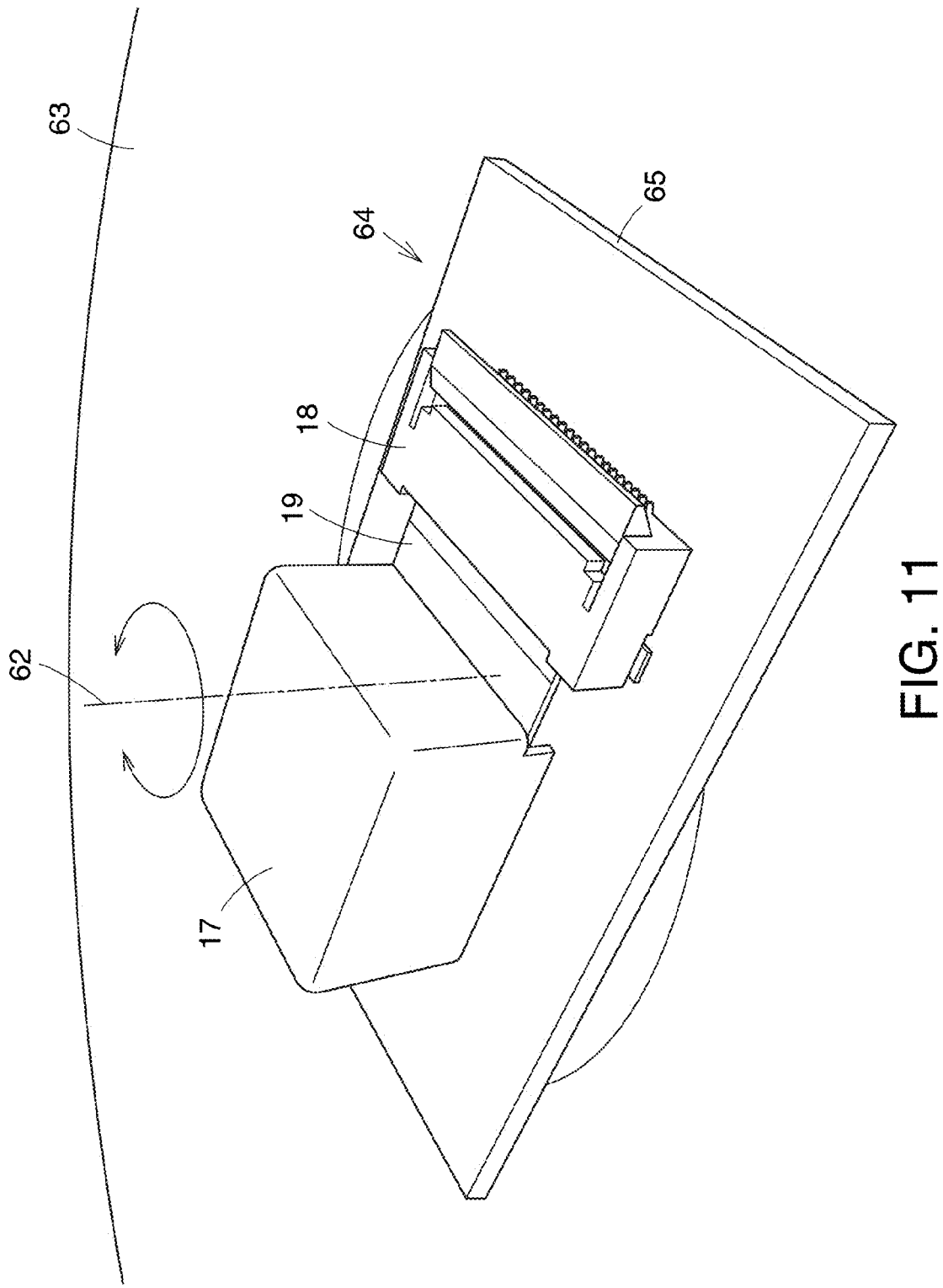
FIG. 11 is an enlarged partial perspective view schematically illustrating the calibration device, showing the sensor unit joined with the calibration device.

The sensor unit 17 can be connected with the socket 18 as illustrated in FIG. 11. In this condition, the sensor unit 17 is set on the rotary table 63. The card edge connector 19 can be fixed to the predetermined position of the rotary table 63. The apparent measurement axes are established on the rotary table 63.

With rotation of the rotary table 63, an external force acts on the first through fourth sensors 43 through 46 in accordance with the rotation. The first through fourth sensors 43 through 46 output detection values based on the action of the external force. In this case, the detection values deviates from the estimated detection values when the postures of the first through fourth sensors 43 through 46 shift from the predetermined positions. The MPU 41 calculates the deviation. The MPU 41 creates the calibration information based on the deviation. The calibration information is stored in the memory 42. Then, the sensor unit 17 is calibrated.

(5) Sensor Unit in Second Embodiment

Figure 12:
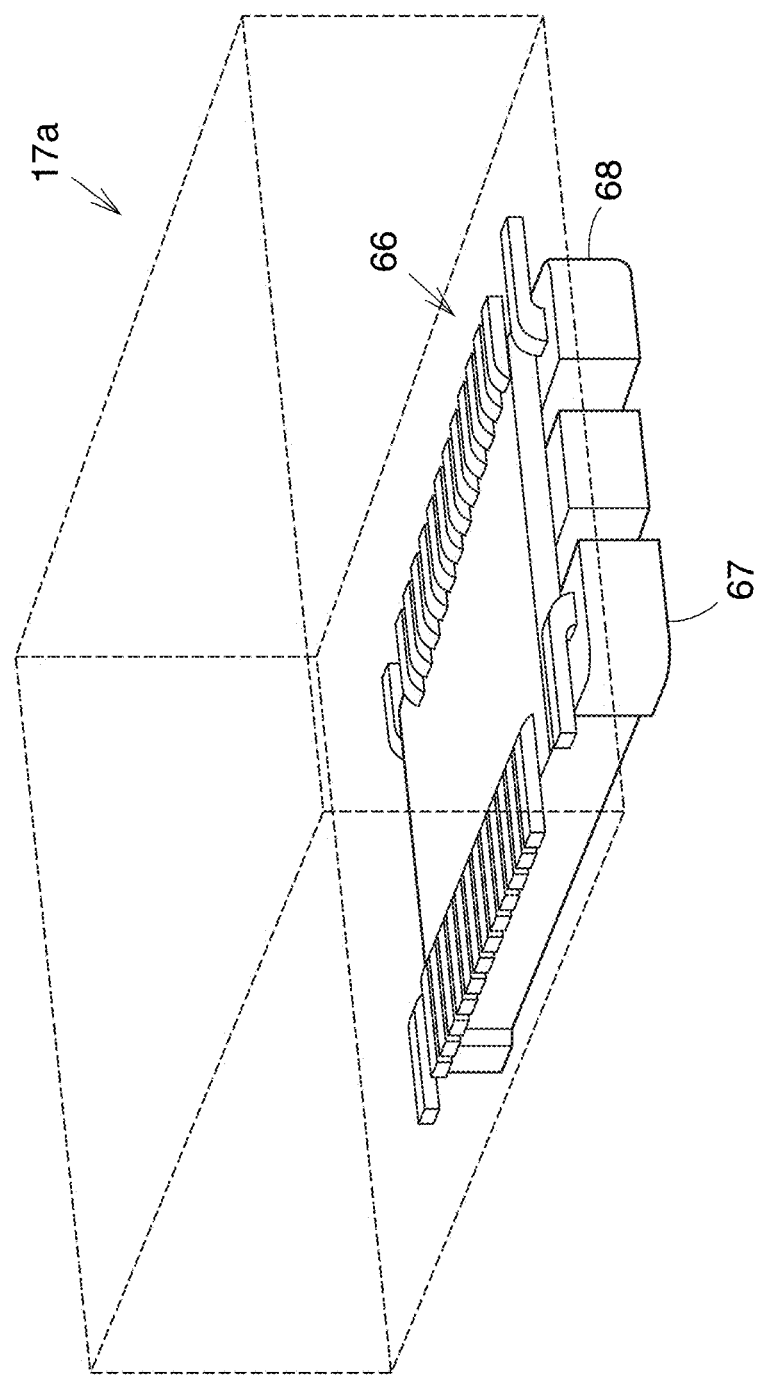
FIG. 12 is an enlarged perspective view schematically illustrating the external appearance of a sensor unit according to a second embodiment.

As illustrated in FIG. 12, a sensor unit 17a according to a second embodiment may have a plug 66 of a B-to-B connector in place of the card edge connector 19. The plug 66 can be mounted on the rear surface of the interface board 24, for example. The plug 66 can be exposed to the outside of the external case 21 through an opening formed in the base 23. The direction of the plug 66 can be regulated by an outer surface 67 facing to below and an outer surface 68 disposed on the side.

Figure 13:
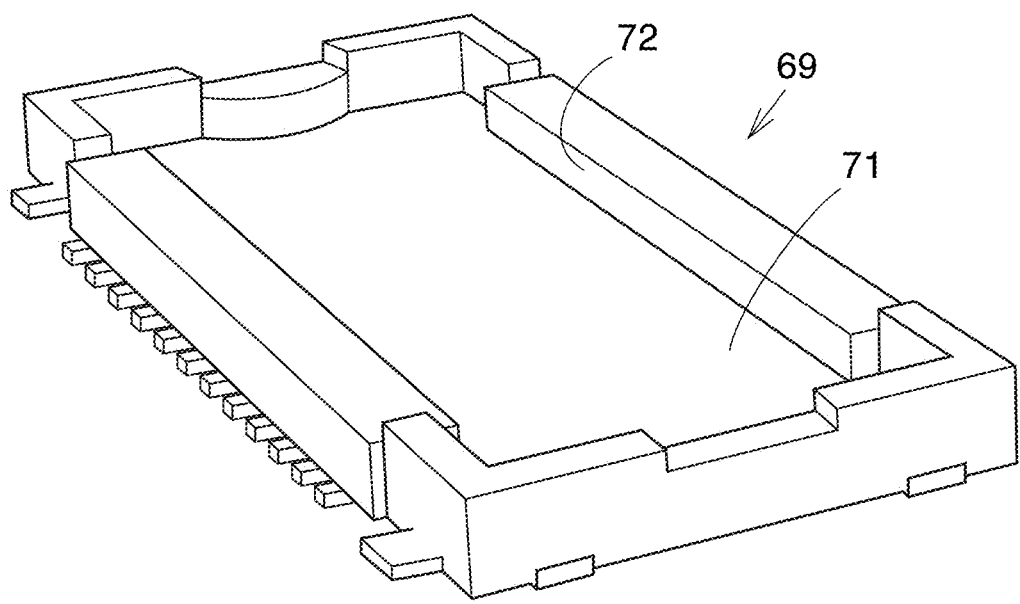
FIG. 13 is an enlarged perspective view schematically illustrating a socket of a B-to-B connector.

On the other hand, a socket 69 of a B-to-B connector can be mounted on the printed-circuit board 15 or 65 of the circuit board unit 14 or the measurement board unit 64 in place of the socket 18 as illustrated in FIG. 13. The socket 69 can define a guide surface 71 which receives the outer surface 67 corresponding to the lower surface (surface facing to below) of the plug 66, and a guide wall 72 which receives the outer surface 68 corresponding to the side surface (surface on the side) of the plug 66. Similarly to the above case, the sensor unit 17a can be fixed in a predetermined posture with respect to the printed-circuit board 15 or 65 when the plug 66 is joined with the socket 69. Other structures are similar to the corresponding structures in the first embodiment.

(6) Sensor Unit in Third Embodiment

Figure 14:
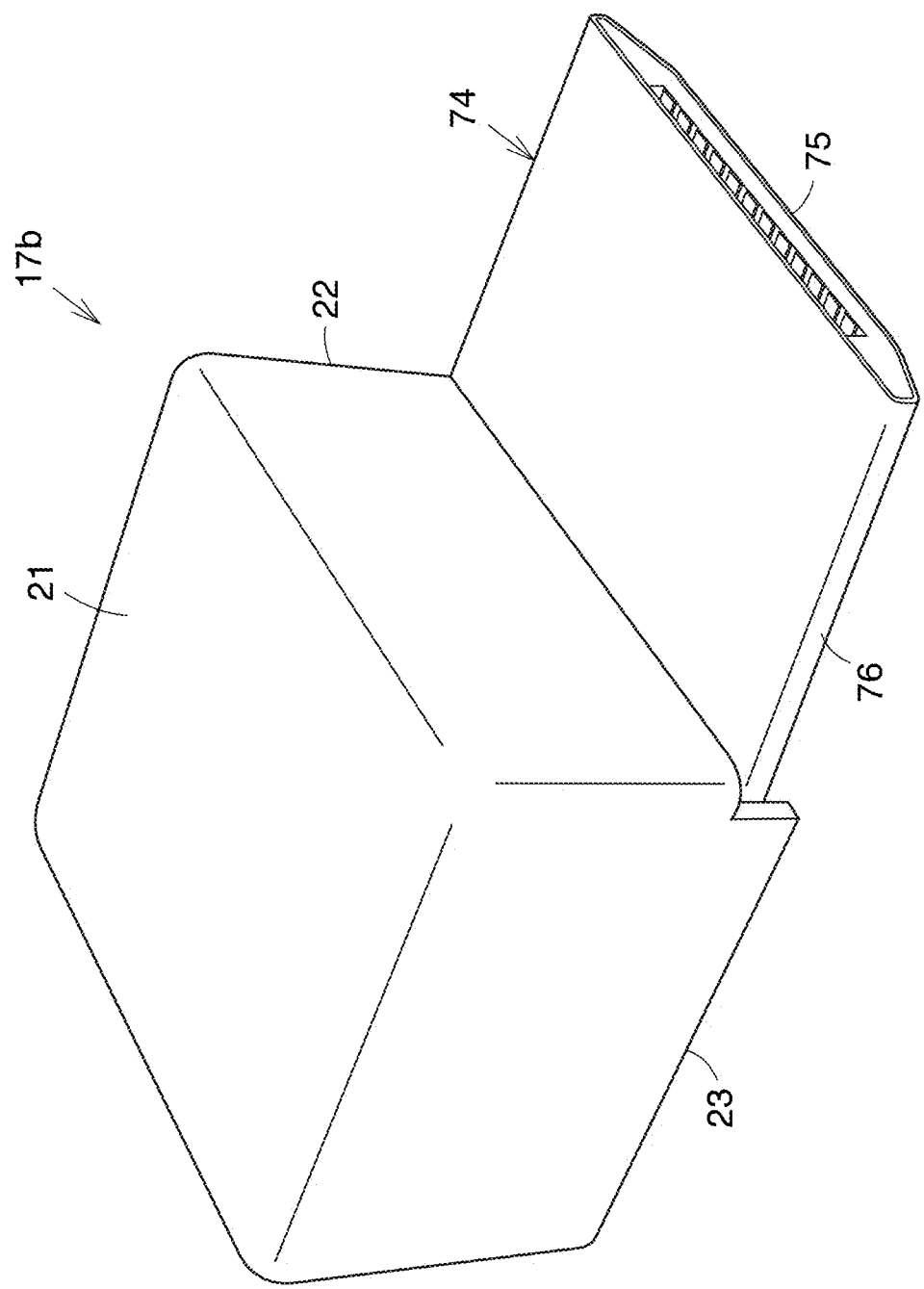
FIG. 14 is an enlarged perspective view schematically illustrating the external appearance of a sensor unit according to a third embodiment.

FIG. 14 schematically illustrates a sensor unit 17b according to a third embodiment. The sensor unit 17b provides a plug 74 of a USB micro-connector (hereinafter referred to as a "connector") in place of the card edge connector 19. The plug 74 can be mounted on the rear surface of the interface board 24, for example. The plug 74 projects from the external case 21. The direction of the plug 74 can be regulated by an outer surface 75 facing to below and an outer surface 76 disposed on the side.

Figure 15:
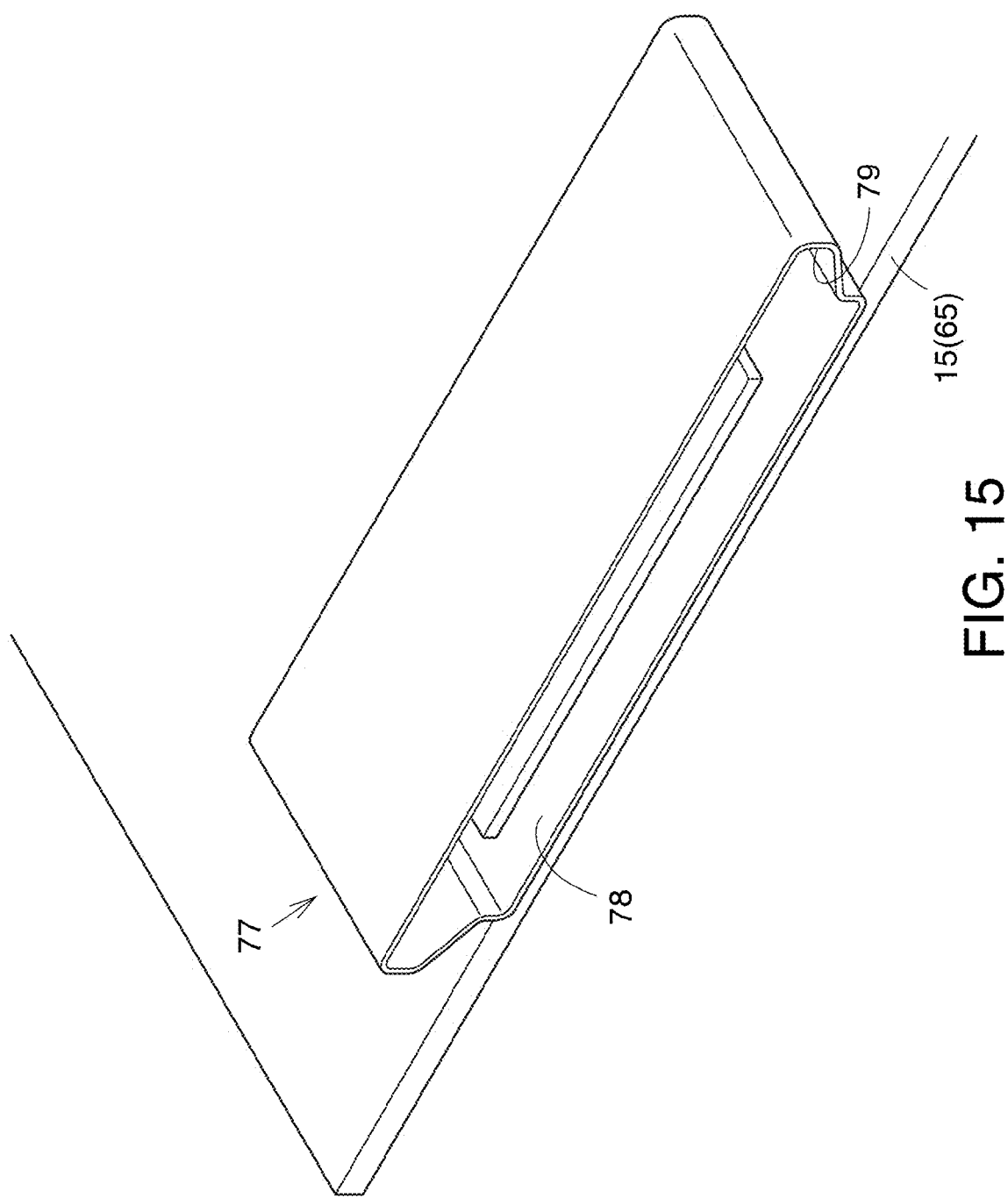
FIG. 15 is an enlarged perspective view schematically illustrating a socket of a USB micro-connector.

On the other hand, a socket 77 of a USB micro-connector can be mounted on the printed-circuit board 15 or 65 of the circuit board unit 14 or the measurement board unit 64 in place of the socket 18 as illustrated in FIG. 15. The socket 77 can define a guide surface 78 which receives the outer surface 75 corresponding to the lower surface (surface facing to below) of the plug 74, and a guide wall 79 which receives the outer surface 76 corresponding to the side surface (surface on the side) of the plug 74. Similarly to the above case, the sensor unit 17b can be fixed in a predetermined posture with respect to the printed-circuit board 15 or 65 when the plug 74 is joined with the socket 77. Other structures are similar to the corresponding structures in the first embodiment.

(7) Other Application Examples of Sensor Unit

Figure 16:
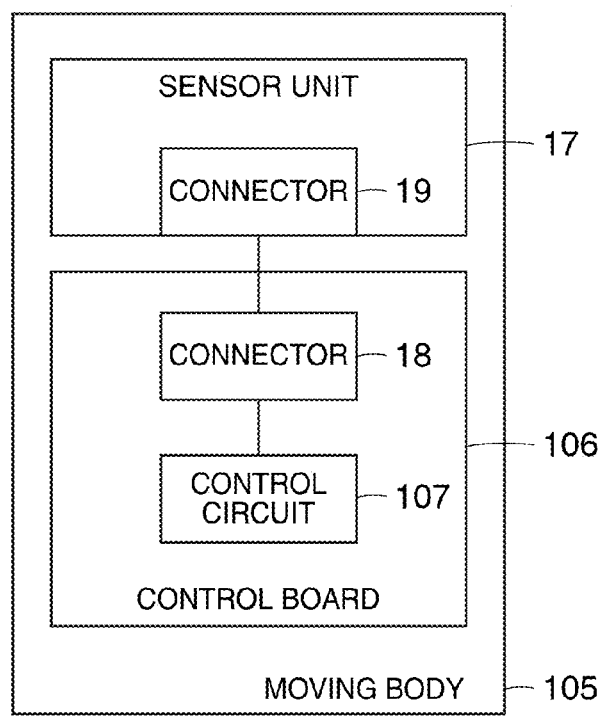
FIG. 16 is a block diagram schematically showing the structure of a moving body according to an embodiment.

As shown in FIG. 16, the respective sensor units 17, 17a, and 17b can be incorporated and used in a moving body 105, for example. According to the moving body 105, a control circuit 107 and the socket 18 (69, 77) are mounted on a control board 106, for example. The card edge connector 19 (or plug 66, 74) of the sensor unit 17, 17a, or 17b can be joined with the socket 18 (69 or 77). The control circuit 107 can receive detection signals from the sensor unit 17, 17a, or 17b. The control circuit 107 can process the detection signals received from the sensor unit 17, 17a, or 17b and control the movement of the moving body 105 in accordance with the processing results. Examples of this control include behavior control for moving bodies, automotive navigation control, start control for automotive air bags, inertial navigation control for airplanes and vessels, guidance control, and others.

Figure 17:
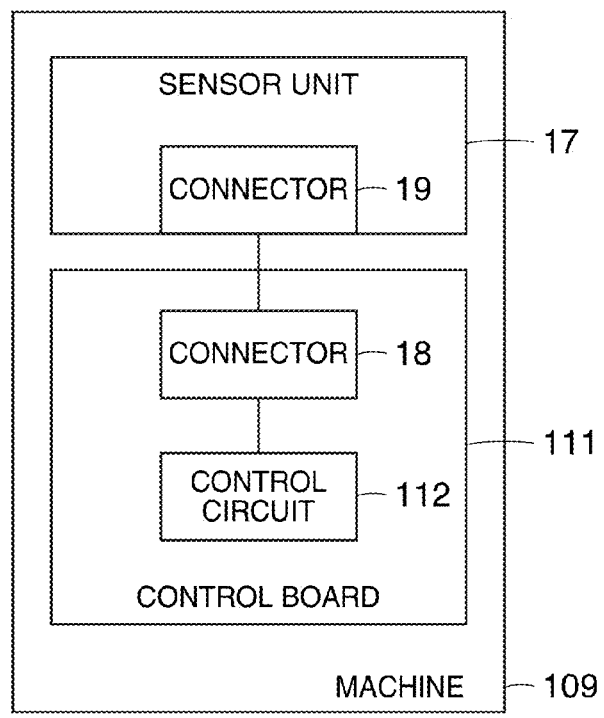
FIG. 17 is a block diagram schematically showing the structure of a machine according to an embodiment.

Alternatively, the respective sensor units 17, 17a, and 17b can be incorporated and used in a machine 109 as shown in FIG. 17. According to the machine 109, a control circuit 112 and the connector socket 18 (69, 77) are mounted on a control board 111, for example. The card edge connector 19 (or plug 66, 74) of the sensor unit 17, 17a, or 17b can be joined with the socket 18 (69, 74), for example. The control circuit 112 can receive detection signals from the sensor unit 17, 17a, or 17b. The control circuit 112 can process the detection signals received from the sensor unit 17, 17a, or 17b, and control the operation of the machine 109 in accordance with the processing results. Examples of this control include vibration control and operation control for industrial machines, and movement control for robots.

It is easily understood for those skilled in the art that the embodiments described in detail herein can be modified in various forms substantially without departure from the scope of novel matters and advantages of the invention. It is therefore intended that all of these modified examples are included in the scope of the invention. For example, terms used in conjunction with other terms providing broader or similar definitions at least once in the specification or drawings can be replaced with other terms in any points in the specification and drawings. In addition, the structures and operations of the smart phone 11, the sensor units 17, 17a, and 17b, the moving body 105, the machine 109 and others are not limited to those described in the embodiments, but may be modified in various manners.

The entire disclosure of Japanese Patent Application No. 2012-131190, filed Jun. 8, 2012 is expressly incorporated by reference herein.

What is claimed is:

1. A sensor unit, comprising: a rigid board that has a top surface and a bottom surface opposite to the top surface; a sensor providing a measurement axis, the sensor being fixed relative to the top surface of the rigid board so that the sensor is located closer to the top surface of the rigid board than the bottom surface of the rigid board; a processing unit that is electrically connected to the sensor, the processing unit being fixed to the rigid board; a connector electrically connected with the processing unit, the connector being fixed to the bottom surface of the rigid board so that the connector is located closer to the bottom surface of the rigid board than the top surface of the rigid board; and a memory unit which stores calibration information for specifying a direction of the measurement axis, the memory unit being fixed relative to the rigid board, wherein a projection member of the connector is projected toward an outside of the sensor unit from the bottom surface of the rigid board, the projection member is configured with first and second outer surfaces respectively extending in first and second directions that are different from each other and the projection member further including a plurality of connection terminals that are provided in a row along the bottom surface of the rigid board, the first and second outer surfaces of the projection member of the connector configure a reference plane, and the calibration information defines the direction of the measurement axis with respect to the reference plane.

2. The sensor unit according to claim 1, wherein the processing unit is configured to correct a detection value detected by the sensor with respect to the measurement axis in accordance with the calibration information to create a corrected detection value based on a reference coordinate system established with respect to the reference plane.

3. The sensor unit according to claim 1, wherein the sensor is at least either a gyro sensor or an acceleration sensor.

4. An electronic device, comprising the sensor unit according to claim 1.

5. A moving body, comprising the sensor unit according to claim 1.

6. A calibration method for a sensor unit, comprising: providing a socket that is fixed to a rotary table; providing the sensor unit, the sensor unit including: a rigid board that has top surface and a bottom surface opposite to the tip surface; a sensor providing a sensor measurement axis, the sensor being fixed relative to the top surface of the rigid board so that the sensor is located closer to the top surface of the rigid board then the bottom surface of the rigid board; a processing unit that is electrically connected to the sensor, the processing unit being fixed relative to the rigid board; a connector electrically connected with the processing unit, the connector being fixed to the bottom surface of the rigid board so that the connector is located closer to the bottom surface of the rigid board then the top surface of the rigid board, the connector having a projection member that is projected toward an outside of the sensor unit from the bottom surface of the rigid board, the projection member being configured with first and second outer surfaces respectively extending in first and second directions that are different from each other and the projection member further including a plurality of connection terminals that are provided in a row along the bottom surface of the rigid board, the first and second outer surfaces configuring a reference plane; and a memory unit which stores calibration information for specifying a direction of the sensor measurement axis with respect to the reference plane, the memory unit being fixed relative to the rigid board; positioning the sensor unit in the rotary table so as to fix the connector to the socket; rotating the rotary table to apply an external force to the sensor so that the sensor outputs a detection value; specifying a deviation between the sensor measurement axis of the sensor and a reference measurement axis defined by the reference plane based on the detection value; and storing the calibration information based on the deviation in the memory unit.

7. The sensor unit according to claim 1, wherein the first and second outer surface have a common edge.

8. The calibration method according to claim 6, wherein the processing unit corrects the detection value so as to create a corrected detection value based on a reference coordinate system established with respect to the reference plane, and
the processing unit specifies the deviation.

* * * * *